US008897702B2

(12) United States Patent
Niu et al.

(10) Patent No.: US 8,897,702 B2
(45) Date of Patent: Nov. 25, 2014

(54) MOBILITY MEASUREMENT USING CSI-RS IN ADDITIONAL CARRIER

(75) Inventors: Huaning Niu, Milpitas, CA (US); Jong-Kae Fwu, Sunnyvale, CA (US); Yuan Zhu, Beijing (CN); Xiaogang Chen, Beijing (CN)

(73) Assignee: Intel Corporation, Santa Clara, CA (US)

(*) Notice: Subject to any disclaimer, the term of this patent is extended or adjusted under 35 U.S.C. 154(b) by 212 days.

(21) Appl. No.: 13/532,946

(22) Filed: Jun. 26, 2012

(65) Prior Publication Data

US 2013/0344816 A1    Dec. 26, 2013

(51) Int. Cl.
 *H04B 5/00*    (2006.01)

(52) U.S. Cl.
 USPC .................. 455/41.1; 455/41.2; 455/63.1

(58) Field of Classification Search
 USPC ......... 455/41.1, 41.2, 63.1, 63.13, 226.1, 522
 See application file for complete search history.

(56) References Cited

FOREIGN PATENT DOCUMENTS

| JP | 2011-082705 A | 4/2011 |
|---|---|---|
| KR | 10-2011-0135723 A | 12/2011 |
| WO | 2014/004037 A1 | 1/2014 |

OTHER PUBLICATIONS

LG Electronics, "Considerations on interference measurement for CoMP CSI feedback", R1-121441, 3GPP TSG RAN WG1 Meeting #68b, Jeju, Korea, Mar. 26-30, 2012, 6 Pages.

NTT Docomo, "CoMP Measurement Set Management for CSI Feedback", R1-120406, 1-3,11-14,22-24 3GPP TSG RAN WG1 Meeting #68, Dresden, Germany, Feb. 6-10, 2012, 3 Pages.

NTT Docomo, "Enhanced Interference Measurement Mechanism for Rei. 11" 1-30 R1-114076, 3GPP TSG RAN WG1 Meeting #67, San Francisco, USA, Nov. 14-18, 2011, 5 Pages.

ZTE, "CSI-RS Muting Evaluation", R1-102900, 3GPP TSG RAN WG1 Meeting #61, 1-3' 11-14,22-24 Montreal, Canada, May 10-14, 2010, 7 Pages.

International Search Report and Written Opinion received for PCT Patent Application No. PCT/US2013/044607 mailed on Sep. 16, 2013, 15 Pages.

*Primary Examiner* — Tuan H Nguyen
(74) *Attorney, Agent, or Firm* — Cool Patent, P.C.

(57) ABSTRACT

A system and a method for a mobility measurement in a wireless network comprises determining at a wireless terminal a channel power estimation $E_S$ for a carrier signal based on Channel State Information Reference Signals (CSI-RS), and determining at the wireless terminal a noise plus interference I+N for the carrier signal based on a muted CSI-RS. The carrier signal is an additional carrier without the presence of a Cell-specific Reference Signal. In one exemplary embodiment, the periodicity of the CSI-RS is selected to be 1, 2 or 3 subframes.

30 Claims, 8 Drawing Sheets

Estimate $E_S$ based on CSI-RS as (1) $E_S = \frac{1}{N} \sum_{i=1}^{N_r} \sum_{j=1}^{N_t} |H_{i,j}|^2$ ;

(2) $E_S = \sum_{i=1}^{N_r} |H_i V|^2$ ; or (3) Estimate RSRP/RSRQ multiple times.

201

Estimate I + N using a muted CSI-RS using $I + N = \frac{1}{N_r \times N_t} \sum_{i=1}^{N_r} \sum_{j=1}^{N_t} |H_{i,j}|^2$ and a minimum periodicity of 1, 2 or 3 subframes.

202

Communicate RSRP/RSRQ measurement and Interference plus Noise measured to Base Station

MOBILITY MEASUREMENT USING CSI-RS IN ADDITIONAL CARRIER

TECHNICAL FIELD

Embodiments described herein are generally directed to the field of wireless communications.

BACKGROUND ART

Additional carrier types for carrier aggregation have been proposed for the Third Generation Partnership Project (3GPP) Radio Layer (RAN1). From the perspective of the Radio to Layer, the main motivations for introducing a new carrier type for carrier aggregation include enhanced spectral efficiency, improved support for a heterogeneous network (hetnet), and energy efficiency.

In one approach to improve spectral efficiency, the Cell-specific Reference Signals (CRS) will not be transmitted on an additional carrier. CRS is conventionally used for all the mobility measurement by an LTE Rel. 8/9/10 UE to measure Reference Signal Received Power (RSRP) and Reference Signal Received Quality (RSRQ) measurement.

Because CRS is used for all the mobility measurement for a conventional LTE Rel. 8/9/10 approach, a different technique is needed for a wireless terminal to measure a full bandwidth Reference Signal Received Power (RSRP) and Reference Signal Received Quality (RSRQ) measurement for the new carrier without the presence of the CRS.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of techniques described herein relate to a technique for mobility measurements that are based on Channel State Information (CSI) reference signals (CSI-RS). In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

To determine Reference Signal Received Power/Reference Signal Received Quality (RSRP/RSRQ), a user equipment (UE) measures signal power, and noise plus interference power. For a conventional UE, RSRP and RSRQ are measured using Cell-specific Reference Signals (CRS). RSRP is a linear average over the power contributions (in Watts) of the resource elements that carry cell-specific reference signals within the considered measurement frequency bandwidth, and RSRQ is a ratio N×RSRP/(E-UTRA carrier RSSI), in which N is the number of resource blocks (RBs) of the E-UTRA carrier received signal strength indication (RSSI) measurement bandwidth, and in which the measurements in the numerator and denominator are made over the same set of resource blocks.

Figure 1:
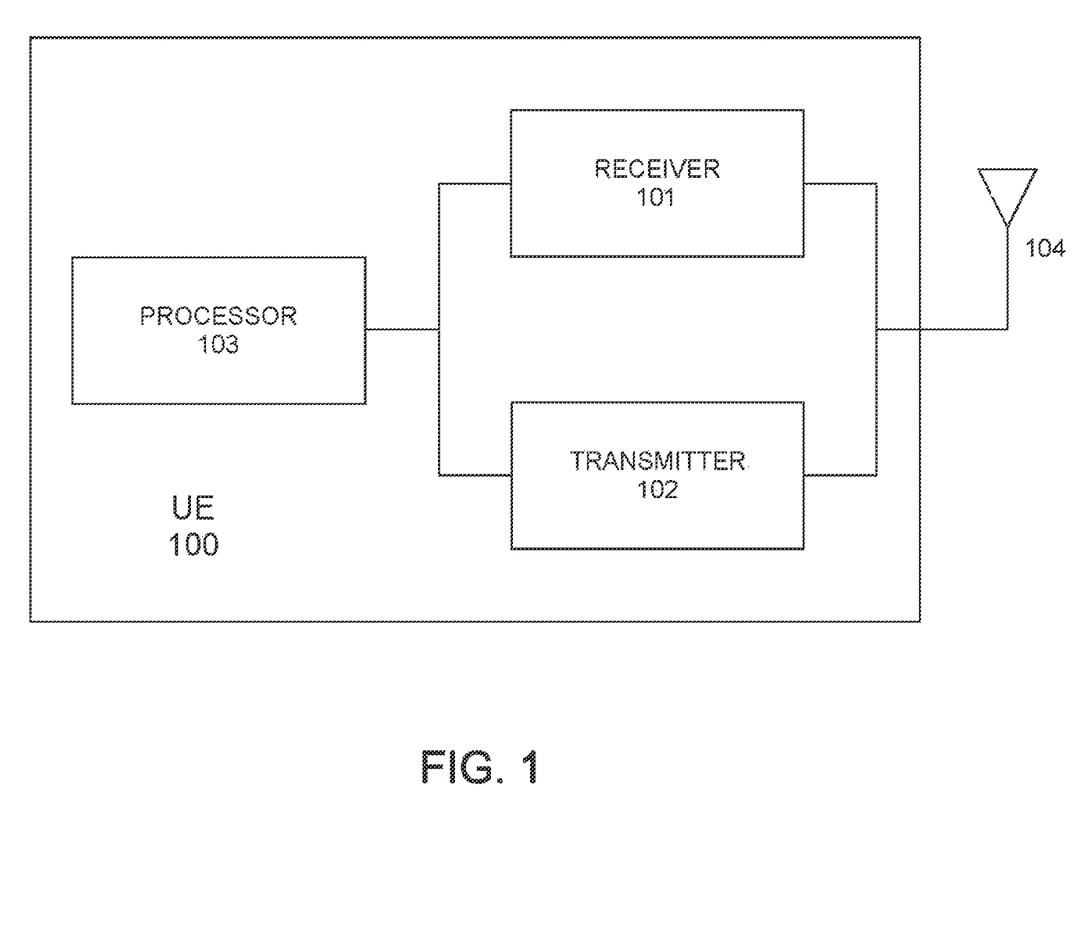
FIG. 1 depicts an exemplary embodiment of a functional block diagram of a UE that utilizes a technique for mobility measurements that are based on Channel State Information (CSI) reference signals (CSI-RS) according to the subject matter disclosed herein.
Figure 2:
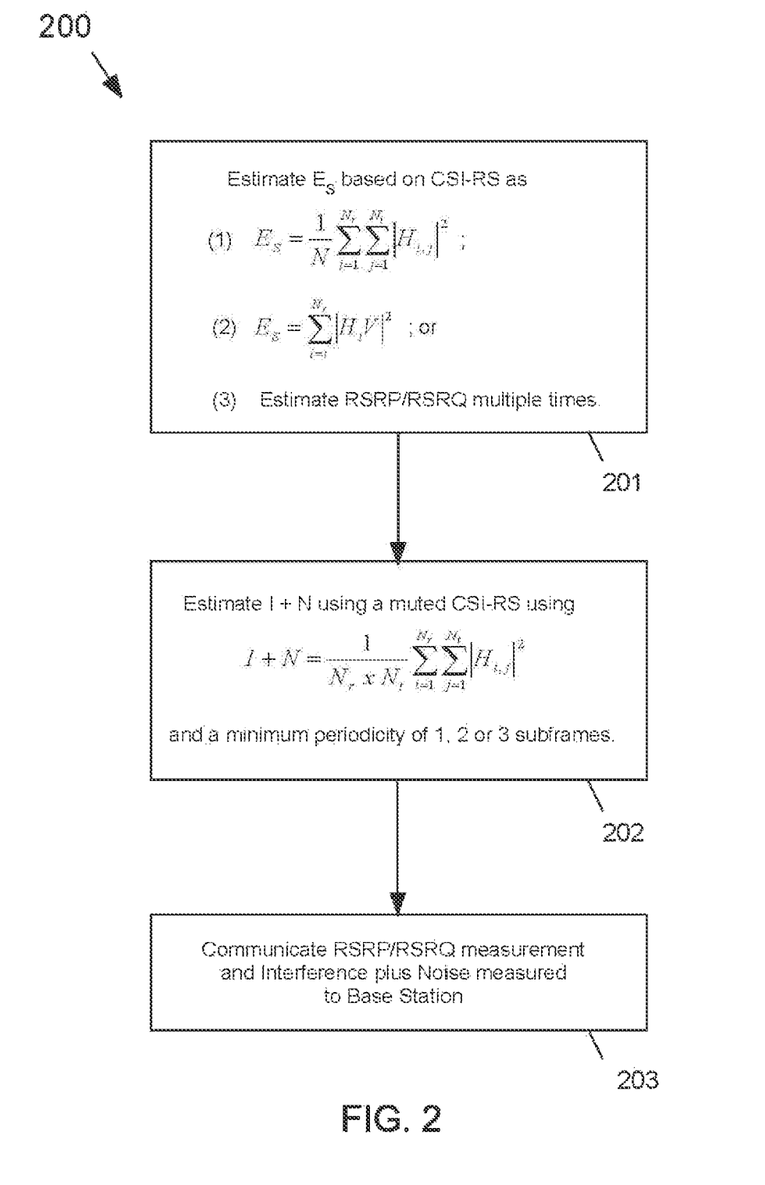
FIG. 2 depicts a process flow for mobility measurements based on CSI-RS according to the subject matter disclosed herein.

For a proposed additional carrier in which CRS has been removed, the subject matter disclosed herein provides a mobility measurement technique used by a wireless terminal that is based on Channel State Information (CSI) reference signals (CSI-RS). According to the subject matter disclosed herein, the mobility measurements comprise two parts: a signal power estimation using CSI-RS, and a noise plus interference power estimation using a muted CSI-RS. FIG. 1 depicts an exemplary embodiment of a functional block diagram of a UE 100 that utilizes a technique for mobility measurements that are based on Channel State Information (CSI) reference signals (CSI-RS) according to the subject matter disclosed herein. FIG. 2 depicts a process flow 200 for mobility measurements based on CSI-RS according to the subject matter disclosed herein.

At depicted in FIG. 1, UE 100 comprises a receiver portion 101, a transmitter portion 102, and a processor 103. Both receiver portion 101 and transmitter portion are coupled to one or more antennas 104 in a well-known manner. Processor 103 is coupled to receiver 102 and is configured to determine a channel power estimation $E_S$ for a carrier signal based on Channel State Information Reference Signals (CSI-RS) received by the receiver, such that the carrier signal is an additional carrier without the presence of a Cell-specific Reference Signal transmitted in a wireless network by a node providing wireless access to the wireless network, such as a base station (BS), an evolved or enhanced NodeB (eNB or eNodeB). Additionally, it should be understood that the terms base station, NodeB, eNB and ENodeB are interchangeable herein. Additionally, processor 103 is configured to determine a noise plus interference I+N for the carrier signal based on a muted CSI-RS. Processor 103 is further configured to transmit to the node providing wireless access to the wireless network the determined channel power estimation $E_S$ and the determined noise plus interference I+N.

CSI-RS is used to conventionally measure the MIMO channel matrix for PMI/CQI (Precoding Matrix Indicator/Channel Quality Indication) calculation. The CSI-RS port is configured by eNB, and the number of CSI-RS ports is equal to the number of antenna ports. For a coordinated multipoint transmission (CoMP) scenario 4 in which a Remote Radio Head (RRH) is deployed, the same CSI-RS port can be reused by a different RRH. A CoMP Scenario 4 is a network having low power RRHs within a macrocell coverage and in which the transmission/reception points created by the RRHs have the same cell IDs as the macro cell. For estimating signal power using CSI-RS, the subject matter disclosed herein provides several different approaches for calculating a scalar signal power based on the matrix channel estimation.

In one exemplary embodiment, the estimated channel power $E_S$ is the average of the channel power from each transmit antenna port while assuming Maximal Ratio Combining (MRC) at the receiver antenna. For this exemplary embodiment, the estimated channel power $E_S$ is determined as $$E_S = \frac{1}{N}\sum_{i=1}^{N_r}\sum_{j=1}^{N_t} |H_{i,j}|^2 \quad (1)$$

in which N is the number of resource blocks (RBs) of the E-UTRA carrier RSSI measurement bandwidth, H is the channel response between $j^{th}$ transmit antenna and $i^{th}$ receive antenna, $N_r$ is the total number of receive antennas at UE, $N_t$ is the total number of transmit antennas at the eNB, i is the receive antenna index, and j is the transmit antenna index.

In another exemplary embodiment, a rank-1 random precoding is used at transmitter and MRC combining at receiver port to estimate the signal power $E_S$ as $$E_S = \sum_{i=1}^{N_r} |H_i V|^2 \quad (2)$$

in which $H_i$ is the column vector corresponding to each receive antenna, V is the $N_t \times 1$ random precoder and i is the receive antenna index. It should be noted that $H_i$ is a $1 \times N_t$ vector, V is an $N_t \times 1$ vector, so $H_i V$ is a scaler.

In yet another exemplary embodiment in which the deployment corresponds to a CoMP scenario 4 with RRH deployment, a subset of CSI-RS ports is used. In this CoMP scenario 4, the same CSI-RS ports are reused among different RRHs. The signal power is estimated multiple times using either of the two previous techniques (Equations 1 and/or 2), and multiple RSRP and RSRQ estimates are reported. These three alternative techniques for measuring the estimated channel $E_S$ are shown at 201 in FIG. 2.

Regarding estimating noise plus interference power using muted CSI-RS, CSI-RS muting is defined for up to 4Tx patterns to support CoMP channel estimation in conventional RAN 1 schemes. Conventionally, the CSI-RS muting periodicity has a minimum period of 5 ms. The CSI-RS periodicity is configured in a higher layer through CSI-RS-Config radio resource control information element. For example, one exemplary embodiment of the CSI-RS-Config information elements used for specifying the CSI reference signal configuration is set forth below.

```
-- ASN1START
CSI-RS-Config-r10 ::=      SEQUENCE {
    csi-RS-r10                 CHOICE {
        release                    NULL,
        setup                      SEQUENCE {
            antennaPortsCount-r10      ENUMERATED {an1, an2, an4, an8},
            resourceConfig-r10         INTEGER (0 ... 31),
            subframeConfig-r10         INTEGER (0 ... 154),
            p-C-r10                    INTEGER (-8 ... 15)
        }
    }                                                        OPTIONAL,    -- Need
ON
    zeroTxPowerCSI-RS-r10      CHOICE {
        release                    NULL,
        setup                      SEQUENCE {
            zeroTxPowerResourceConfigList-r10     BIT STRING (SIZE (16)),
```

| | |
|---|---|
| zeroTxPowerSubframeConfig-r10 | INTEGER (0 ... 154) |
| } | |
| } | OPTIONAL -- Need |
| ON | |
| } | |
| -- ASN1STOP | |

One exemplary embodiment of the periodicity and subframe offset $I_{CSI-RS}$ is conventionally defined in Table 6.10.5.3-1 of the 3GPP TS 36.211, which is reproduced below.

TABLE 6.10.5.3-1

CSI reference signal subframe configuration.

| CSI-RS-SubframeConfig $I_{CSI-RS}$ | CSI-RS Periodicity $T_{CSI-RS}$ (subframes) | CSI-RS subframe offset $\Delta_{CSI-RS}$ subframes |
|---|---|---|
| 0-4 | 5 | $I_{CSI-RS}$ |
| 5-14 | 10 | $I_{CSI-RS}$ − 5 |
| 15-24 | 20 | $I_{CSI-RS}$ − 15 |
| 35-74 | 40 | $I_{CSI-RS}$ − 35 |
| 75-154 | 80 | $I_{CSI-RS}$ − 75 |

When a muted CSI-RS is used to determine interference plus noise power in RSRQ, the 5 ms periodicity is insufficient due to enhanced Inter-Cell Interference Coordination (eICIC), which creates a significantly diversified interference pattern from subframe to subframe. Consequently, according to the subject matter disclosed herein, the minimum periodicity should be reduced to less than 5 subframes. Depending on the eICIC measurement pattern, the m periodicity could be 1, 2 or 3. Accordingly, according to the subject matter disclosed herein, one exemplary embodiment of a minimum periodicity set to 1 is shown in the last row of Table 1 below for a CSI-RS-SubframeConfig of 155.

TABLE 1

CSI reference signal subframe configuration
Additional Carrier for Carrier Aggregation

| CSI-RS-SubframeConfig $I_{CSI-RS}$ | CSI-RS Periodicity $T_{CSI-RS}$ (subframes) | CSI-RS subframe offset $\Delta_{CSI-RS}$ subframes |
|---|---|---|
| 0-4 | 5 | $I_{CSI-RS}$ |
| 5-14 | 10 | $I_{CSI-RS}$ − 5 |
| 15-24 | 20 | $I_{CSI-RS}$ − 15 |
| 35-74 | 40 | $I_{CSI-RS}$ − 35 |
| 75-154 | 80 | $I_{CSI-RS}$ − 75 |
| 155 | 1 | No Offset |

According to the subject matter disclosed herein, the corresponding value in CSI-RS-Config should also be modified.

To estimate the interference plus noise power using a muted CSI-RS, the muted CSI-RS ports and receiver antennas are averaged as $$I + N = \frac{1}{N_r \times N_t} \sum_{i=1}^{N_r} \sum_{j=1}^{N_t} |H_{i,j}|^2, \quad (3)$$

in which $N_t$ is the number of muted CSI-RS ports, $N_r$ is the receive antenna number, and $H_{i,j}$ is the estimated channel. The technique for measuring interference plus noise power using a muted CSI-RS is shown at 202 in FIG. 2.

The measurements of RSRP and RSRQ for the estimated channel $E_S$ and the interference plus noise power using a muted CSI-RS is communicated to the base station at 203 in FIG. 2.

In order to distinguish the RSRP and RSRQ measurements made in accordance with the subject matter disclosed herein, the RSRQ can be defined as RSRP/(RSPR+I+N), in which I+N is measured from a muted CSI-RS pattern. In contrast, a conventional RSRQ is defined as N×RSRP/(E−UTRA carrier RSSI) in 3GPP TS 36.214.

Figure 3:
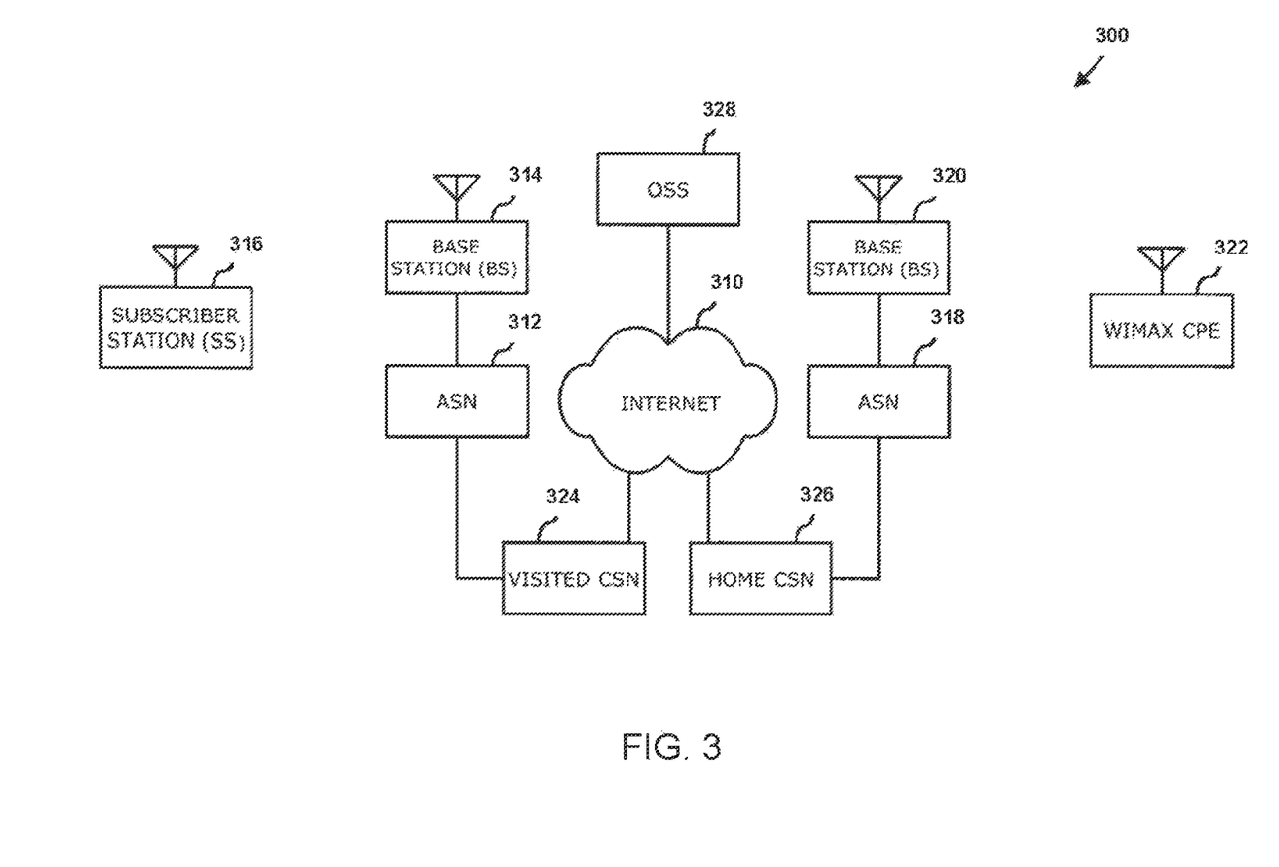
FIG. 3 depicts a block diagram of an exemplary configuration of a wireless network in accordance with one or more exemplary embodiments disclosed herein.

FIG. 3 depicts a block diagram of an exemplary configuration of a wireless network 300 in accordance with one or more exemplary embodiments disclosed herein. One or more of the elements of wireless network 300 may utilize a technique for a mobility measurement based on CSI-RS according to the subject matter disclosed herein. As shown in FIG. 3, network 300 may be an Internet-Protocol-type (IP-type) network comprising an Internet-type network 310, or the like, that is capable of supporting mobile wireless access and/or fixed wireless access to Internet 310. In one or more exemplary embodiments, network 300 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11a/b/g/n standard), and so on. In one or more alternative exemplary embodiments, network 300 may be in compliance with a Third Generation Partnership Project Long Term Evolution (3GPP LTE) or a 3GPP2 Air Interface Evolution (3GPP2 AIE) standard. In general, network 300 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4fi Generation (4G) type network, and so on, and the scope of the claimed subject matter is not limited in these respects. As an example of mobile wireless access, access service network (ASN) 312 is capable of coupling with base station (BS) 314 to provide wireless communication between subscriber station (SS) 316 (also referred to herein as a wireless terminal) and Internet 310. It should be understood that base station 314 could also be configured to be an evolved or enhanced NodeB (eNB or eNodeB), and that the terms base station, NodeB, eNB and ENodeB are interchangeable. Subscriber station 316 may comprise a mobile-type device or information-handling system capable of wirelessly communicating via network 300, for example, a notebook-type computer, a cellular telephone, a personal digital assistant, an M2M-type device, or the like. In one exemplary embodiment, subscriber station 316 utilizes a mobility measurement technique used by a wireless terminal that is based on Channel State Information (CSI) reference signals (CSI-RS) according to the subject matter disclosed herein. ASN 312 may implement profiles that are capable of defining the mapping of network functions to one or more physical entities on network 300. Base station 314 may comprise radio equipment to provide radio-frequency (RF) communication with subscriber station 316, and may comprise, for example, the physical layer (PHY) and media access control (MAC) layer equipment in compliance with an IEEE 802.16e-type standard. Base station 314 may further comprise an IP backplane to couple to Internet 310 via ASN 312, although the scope of the claimed subject matter is not limited in these respects.

Network 300 may further comprise a visited connectivity service network (CSN) 324 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 326, and the scope of the claimed subject matter is not limited in these respects. Visited CSN 324 may be referred to as a visited CSN in the case, for example, in which visited CSN 324 is not part of the regular service provider of subscriber station 316, for example, in which subscriber station 316 is roaming away from its home CSN, such as home CSN 326, or, for example, in which network 300 is part of the regular service provider of subscriber station, but in which network 300 may be in another location or state that is not the main or home location of subscriber station 316. In a fixed wireless arrangement, WiMAX-type customer premises equipment (CPE) 322 may be located in a home or business to provide home or business customer broadband access to Internet 310 via base station 320, ASN 318, and home CSN 326 in a manner similar to access by subscriber station 316 via base station 314, ASN 312, and visited CSN 324, a difference being that WiMAX CPE 322 is generally disposed in a stationary location, although it may be moved to different locations as needed, whereas subscriber station may be utilized at one or more locations if subscriber station 316 is within range of base station 314, for example. It should be noted that CPE 322 need not necessarily comprise a WiMAX-type terminal, and may comprise other types of terminals or devices compliant with one or more standards or protocols, for example, as discussed herein, and in general may comprise a fixed or a mobile device. It should also be understood that base station 320 could also be configured to be an evolved or enhanced NodeB (eNB or eNodeB), and that the terms base station, NodeB, eNB and ENodeB are interchangeable. Additionally, in one exemplary embodiment CPE 322 utilizes a mobility measurement technique used by a wireless terminal that is based on Channel State Information (CSI) reference signals (CSI-RS) according to the subject matter disclosed herein. In accordance with one or more embodiments, operation support system (OSS) 328 may be part of network 300 to provide management functions for network 300 and to provide interfaces between functional entities of network 300. Network 300 of FIG. 3 is merely one type of wireless network showing a certain number of the components of network 300; however, the scope of the claimed subject matter is not limited in these respects.

Figure 4:
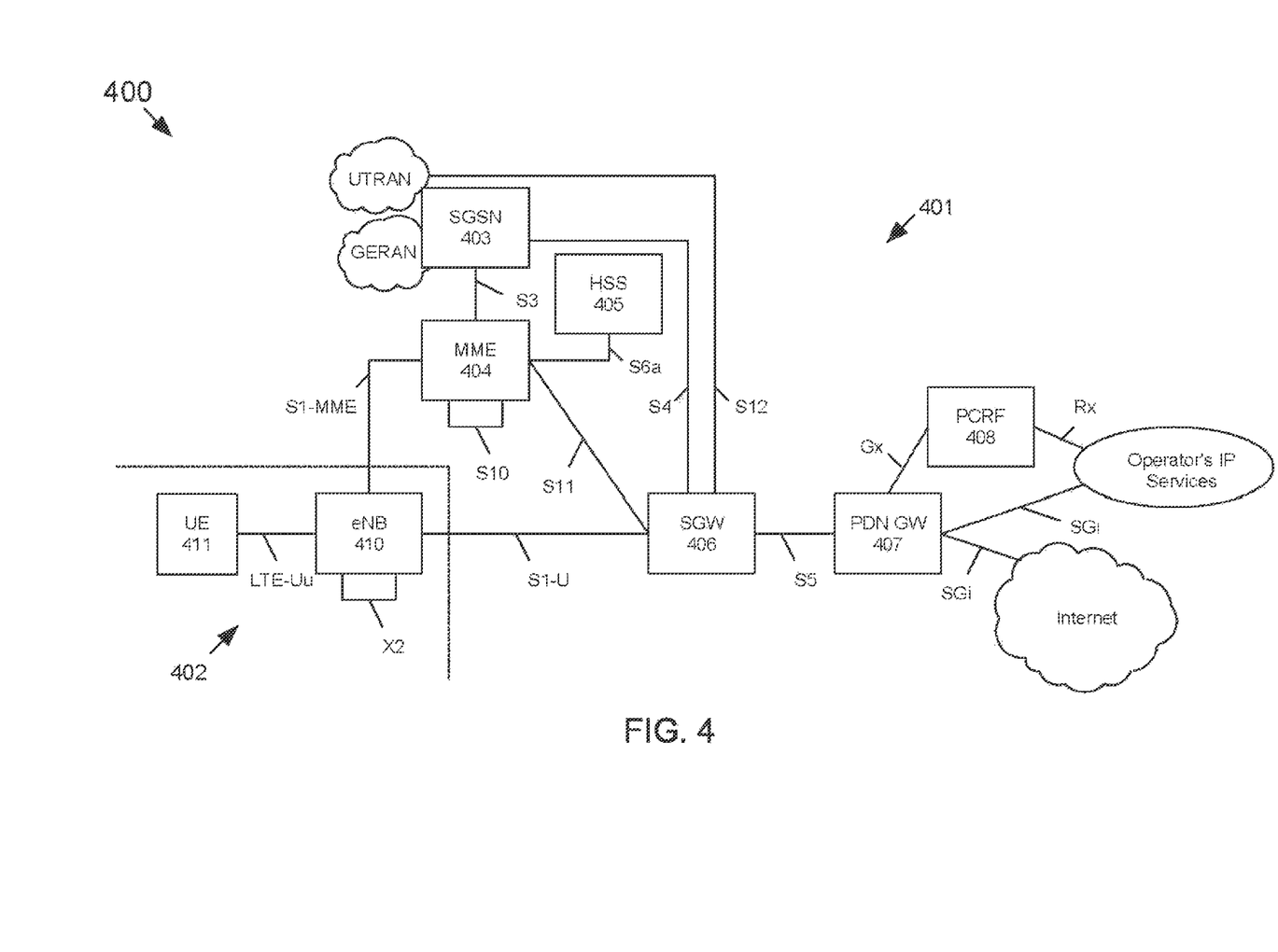
FIG. 4 shows an exemplary block diagram of the overall architecture of a 3GPP LTE network that utilizes a technique for a mobility measurement based on CSI-RS according to the subject matter disclosed herein.

FIG. 4 shows an exemplary block diagram of the overall architecture of a 3GPP LTE network 400 that utilizes a technique for a mobility measurement based on CSI-RS according to the subject matter disclosed herein. FIG. 4 also generally shows exemplary network elements and exemplary standardized interfaces. At a high level, network 400 comprises a core network (CN) 401 (also referred to as an evolved Packet System (EPC)), and an air-interface access network E-UTRAN 302. CN 401 is responsible for the overall control of the various User Equipment (UE) connected to the network and establishment of the bearers. CN 401 may include functional entities, such as a home agent HA and/or an ANDSF server or entity, although not explicitly depicted. E-UTRAN 402 is responsible for all radio-related functions.

The main exemplary logical nodes of CN 401 include, but are not limited to, a Serving GPRS Support Node 403, the Mobility Management Entity 404, a Home Subscriber Server (HSS) 405, a Serving Gate (SGW) 406, a PDN Gateway 407 and a Policy and Charging Rules Function (PCRF) Manager 408. The functionality of each of the network elements of CN 401 is well known and is not described herein. Each of the network elements of CN 401 are interconnected by well-known exemplary standardized interfaces, some of which are indicated in FIG. 4, such as interfaces S3, S4, S5, etc., although not described herein.

While CN 401 includes many logical nodes, the E-UTRAN access network 402 is formed by one node, the evolved NodeB (base station (BS), eNB or eNodeB) 410, which connects to one or more User Equipment (UE) 411, of which only one is depicted in FIG. 4. UE 411 is also referred to herein as a wireless device (WD) and/or a subscriber station (SS), and can include an M2M-type device. In one exemplary embodiment, UE 411 utilizes a mobility measurement technique used by a wireless terminal that is based on Channel State Information (CSI) reference signals (CSI-RS) according to the subject matter disclosed herein. In one exemplary configuration, a single cell of an E-UTRAN access network 402 provides one substantially localized geographical transmission point (having multiple antenna devices) that provides access to one or more UEs. In another exemplary configuration, a single cell of an E-UTRAN access network 402 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic is (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 404 by an S1-MME interface and to SGW 406 by an S1-U interface. The protocols that run between the eNBs and the UEs are generally referred to as the "AS protocols." Details of the various interfaces are well known and not described herein.

The eNB 410 hosts the PHYsical (PHY), Medium Access Control (MAC), Radio Link Control (RLC), and Packet Data Control Protocol (PDCP) layers, which are not shown in FIG. 4, and which include the functionality of user-plane header-compression and encryption. The eNB 410 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 410 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 411, generates pages for UEs 411 over the air, broadcasts system information, controls UE measurement reporting, such as the periodicity of Channel Quality Information (CQI) reports, and allocates cell-level temporary identifiers to active UEs 411. The RRC layer also executes transfer of UE context from a source eNB to a target eNB during handover, and provides integrity protection for RRC messages. Additionally, the RRC layer is responsible for the setting up and maintenance of radio bearers.

Figure 5:
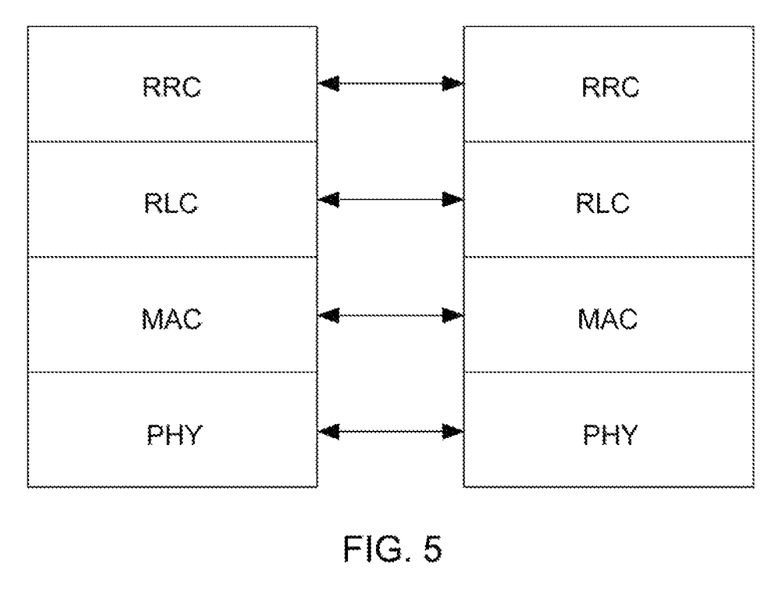
FIGS. 5 and 6 respectively depict exemplary radio interface protocol structures between a UE and an eNodeB that are based on a 3GPP-type radio access network standard and that utilize a technique for a mobility measurement based on CSI-RS according to the subject matter disclosed herein
Figure 6:
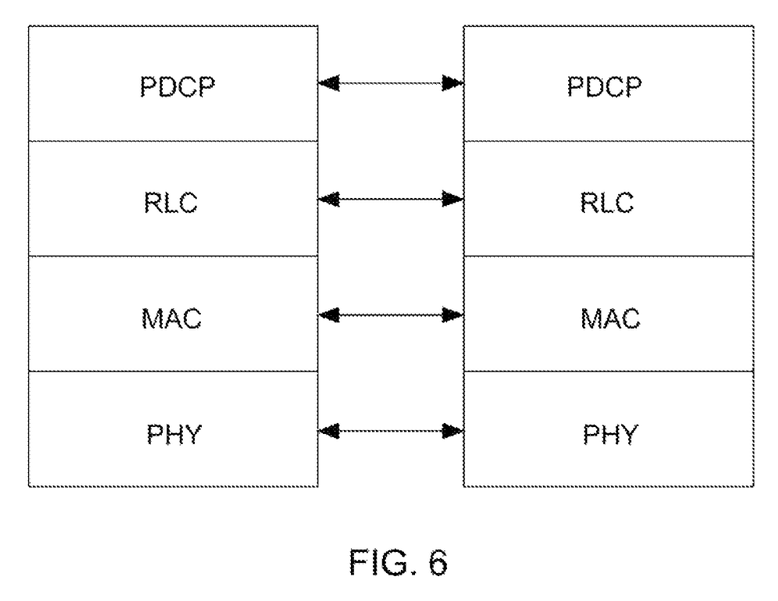

FIGS. 5 and 6 respectively depict exemplary radio interface protocol structures between a UE and an eNodeB that are based on a 3GPP-type radio access network standard and that utilize a technique for a mobility measurement based on CSI-RS according to the subject matter disclosed herein. More specifically, FIG. 5 depicts individual layers of a radio protocol control plane and FIG. 6 depicts individual layers of a radio protocol user plane. The protocol layers of FIGS. 5 and 6 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 7:
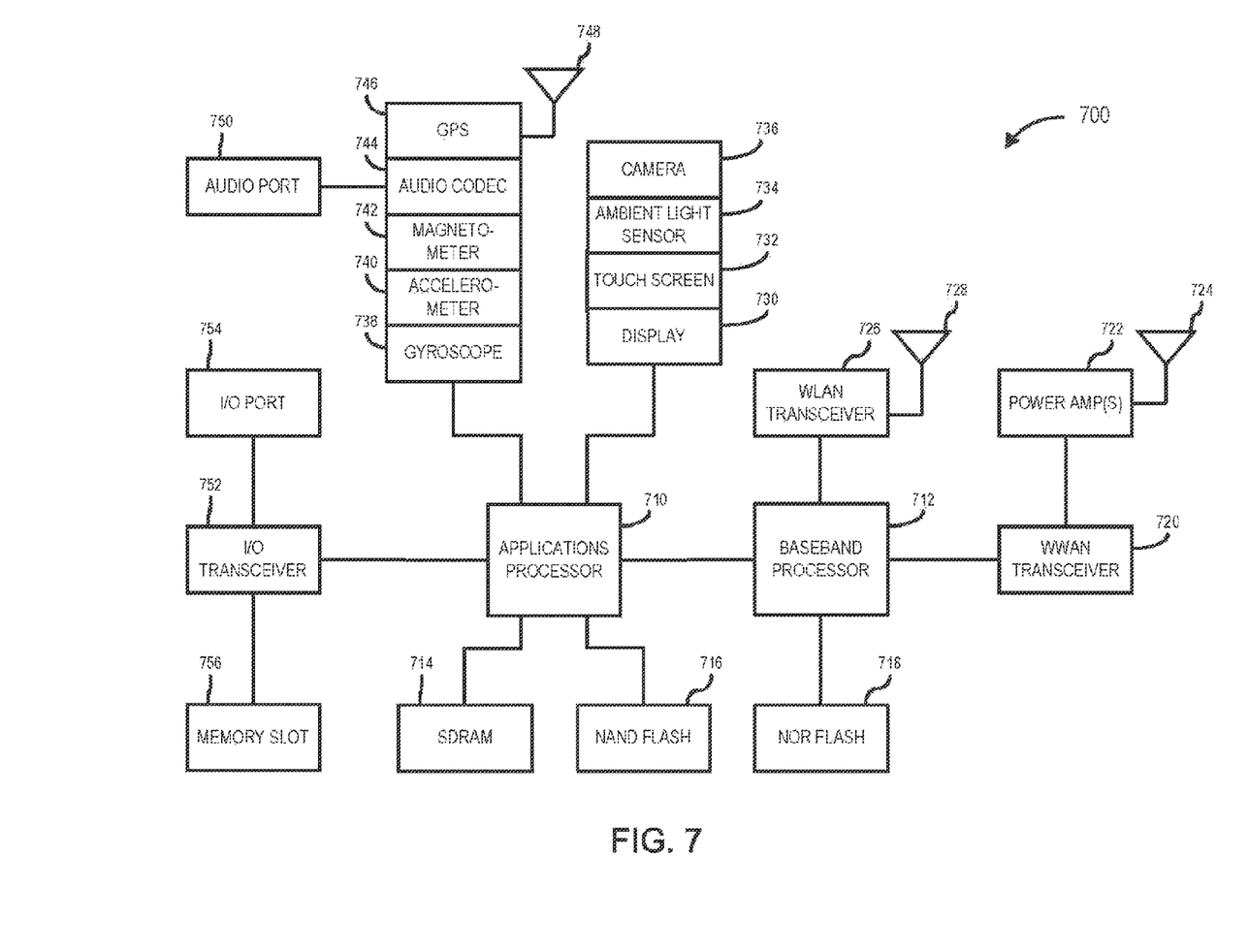
FIG. 7 depicts an exemplary functional block diagram of an information-handling system that utilizes a technique for a mobility measurement based on CSI-RS according to the m subject matter disclosed herein.

FIG. 7 depicts an exemplary functional block diagram of an information-handling system 700 that utilizes a technique for a mobility measurement based on CSI-RS according to the subject matter disclosed herein. Information-handling system 700 of FIG. 7 may tangibly embody one or more of any of the exemplary network elements and/or functional entities of the network as shown in and described with respect to FIG. 3, and/or core network 401 as shown in and described with respect to FIG. 4. In one exemplary embodiment, information-handling system 700 may represent the components of an M2M-type device as embodied by subscriber station 316, CPE 322, base stations 314 and 320, eNB 410, and/or UE 411, with greater or fewer components depending on the hardware specifications of the particular device or network element. Although information-handling system 700 represents one example of several types of computing platforms, information-handling system 700 may include more or fewer elements and/or different arrangements of elements than shown in FIG. 7, and the scope of the claimed subject matter is not limited in these respects.

In one or more embodiments, information-handling system 700 may comprise one or more applications processor 710 and a baseband processor 712. Applications processor 710 may be utilized as a general purpose processor to run applications and the various subsystems for information handling system 700. Applications processor 710 may include a single core or alternatively may include multiple processing cores wherein one or more of the cores may comprise a digital signal processor or digital signal processing core. Furthermore, applications processor 710 may include a graphics processor or coprocessor disposed on the same chip, or alternatively a graphics processor coupled to applications processor 710 may comprise a separate, discrete graphics chip. Applications processor 710 may include on-board memory, such as cache memory, and further may be coupled to external memory devices such as synchronous dynamic random access memory (SDRAM) 714 for storing and/or executing applications during operation, and NAND flash 716 for storing applications and/or data even when information handling system 700 is powered off. Baseband processor 712 may control the broadband radio functions for information-handling system 700. Baseband processor 712 may store code for controlling such broadband radio functions in a NOR flash 718. Baseband processor 712 controls a wireless wide area network (WWAN) transceiver 720 which is used for modulating and/or demodulating broadband network signals, for example for communicating via a 3GPP LTE network or the like as discussed herein with respect to FIG. 7. Baseband processor 712 may also control a wireless wide area network (WWAN) transceiver 720 that is used for modulating and/or demodulating a wireless local area network (WLAN) signals.

In one exemplary embodiment, transceiver 720 comprises a receiver portion that is capable of determining a channel power estimation $E_S$ (see Equations 1 and/or 2) for a carrier signal based on Channel State Information Reference Signals (CSI-RS), such that the carrier signal is an additional carrier without the presence of a Cell-specific Reference Signal transmitted in the WWAN by a base station. Further, the receiver portion of transceiver 720 is also capable of determining at the mobile station a noise plus interference I+N (see Equation 3) for the carrier signal based on a muted CSI-RS in accordance with the subject matter disclosed herein and in which the periodicity of the CSI-RS is 1, 2 or 3 subframes. Transceiver 720 also comprises a transmitter portion is capable of transmitting to a base station of the WWAN the determined channel power estimation $E_S$ and the determined noise plus interference I+N.

WWAN transceiver 720 couples to one or more power amplifiers 722 that are respectively coupled to one or more antennas 724 for sending and receiving radio-frequency signals via the WWAN broadband network. WWAN broadband network may comprise an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

WLAN transceiver 726 is coupled to one or more suitable antennas 728 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 710 and baseband processor 712, and the scope of the claimed subject matter is not limited in these respects. For example, any one or more of SDRAM 714, NAND flash 716 and/or NOR flash 718 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 710 may drive a display 730 for displaying various information or data, and may further receive touch input from a user via a touch screen 732, for example, via a finger or a stylus. An ambient light sensor 734 may be utilized to detect an amount of ambient light in which information-handling system 700 is operating, for example, to control a brightness or contrast value for display 730 as a function of the intensity of ambient light detected by ambient light sensor 734. One or more cameras 736 may be utilized to capture images that are processed by applications processor 710 and/or at least temporarily stored in NAND flash 716. Furthermore, applications processor may couple to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Alternatively, controller 746 may comprise a Global Navigation Satellite System (GNSS) controller. Audio CODEC 744 may be coupled to one or more audio ports 750 to provide microphone input and speaker outputs either via internal devices and/or via external devices coupled to information-handling system via the audio ports 750, for example via a headphone and microphone jack. In addition, applications processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory, such as secure digital (SD) card or a subscriber identity module (SIM) card, although the scope of the claimed subject matter is not limited in these respects.

Figure 8:
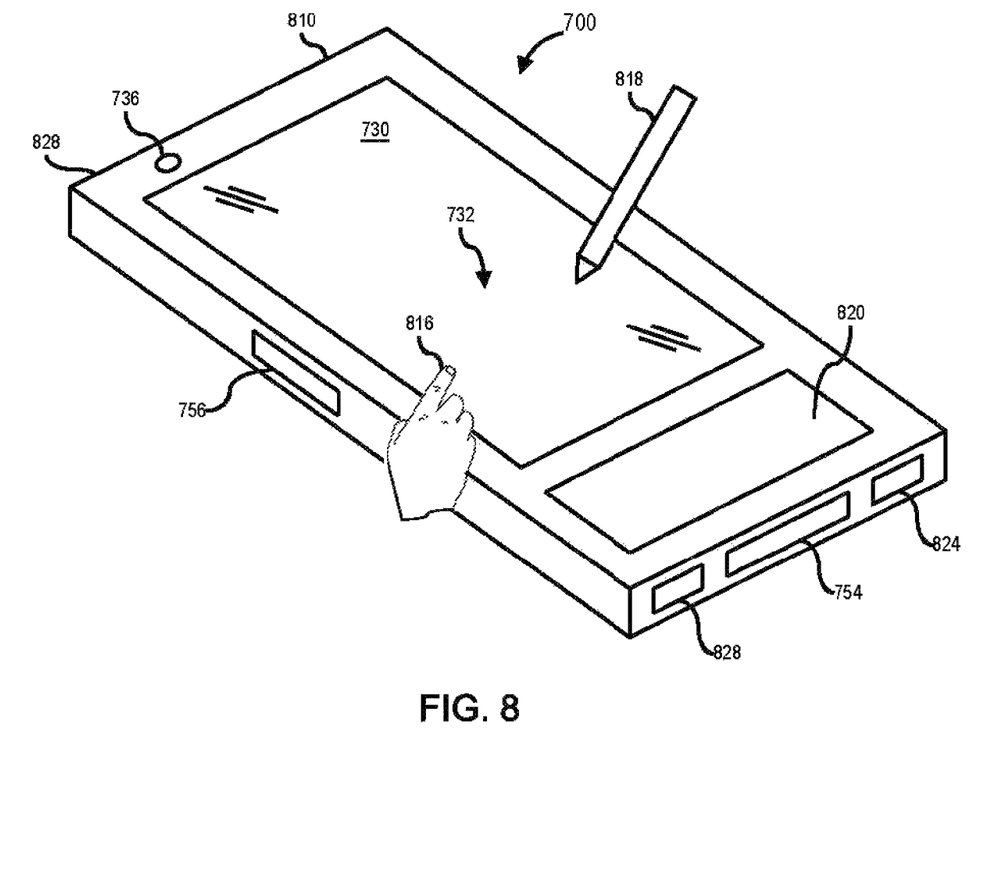
FIG. 8 depicts an isometric view of an exemplary embodiment of the information-handling system of FIG. 7 that optionally may include a touch screen in accordance with one or more embodiments disclosed herein.

FIG. 87 depicts an isometric view of an exemplary embodiment of the information-handling system of FIG. 7 that optionally may include a touch screen in accordance with one or more embodiments disclosed herein. FIG. 8 shows an example implementation of information-handling system 700 of FIG. 7 tangibly embodied as a cellular telephone, smartphone, or tablet-type device or the like. In one or more embodiments, the information-handling system 700 may comprise any one of the infrastructure nodes, subscriber station 316, CPE 322, mobile station UE 411 of FIG. 4, and/or an M2M-type device, although the scope of the claimed subject matter is not limited in this respect. The information-handling system 700 may comprise a housing 810 having a display 730 that may include a touch screen 732 for receiving tactile input control and commands via a finger 816 of a user and/or a via stylus 818 to control one or more applications processors 710. The housing 810 may house one or more components of information-handling system 700, for example, one or more applications processors 710, one or more of SDRAM 714, NAND flash 716, NOR flash 718, baseband processor 712, and/or WWAN transceiver 720. The information-handling system 700 further may optionally include a physical actuator area 820 which may comprise a keyboard or buttons for controlling information-handling system via one or more buttons or switches. The information-handling system 700 may also include a memory port or slot 756 for receiving non-volatile memory, such as flash memory, for example, in the form of a secure digital (SD) card or a subscriber identity module (SIM) card. Optionally, the information-handling system 700 may further include one or more speakers and/or microphones 824 and a connection port 754 for connecting the information-handling system 700 to another electronic device, dock, display, battery charger, and so on. Additionally, information-handling system 700 may include a headphone or speaker jack 828 and one or more cameras 736 on one or more sides of the housing 810. It should be noted that the information-handling system 700 of FIGS. 7 and 8 may include more or fewer elements than shown, in various arrangements, and the scope of the claimed subject matter is not limited in this respect.

Figure 9:
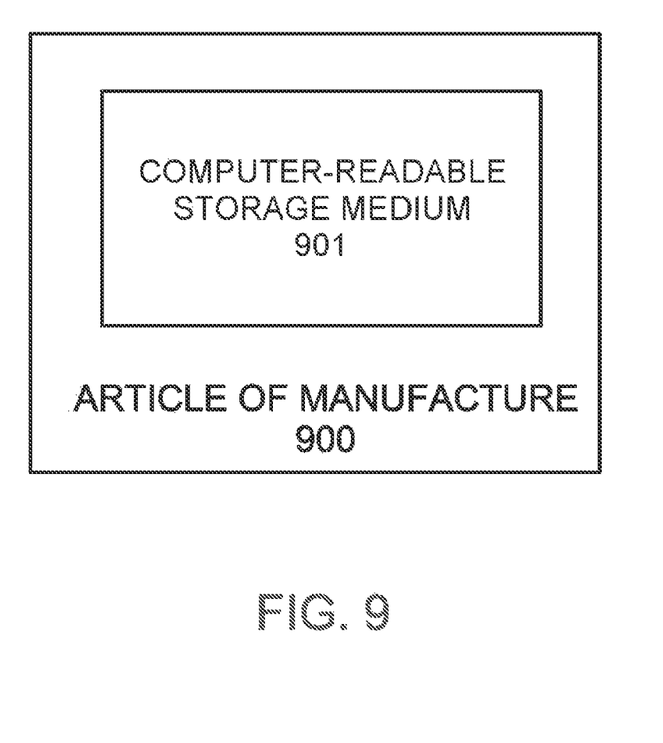
FIG. 9 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 9 depicts an exemplary embodiment of an article of manufacture 900 comprising a non-transitory computer-readable storage medium 901 having stored thereon computer-readable instructions that, when executed by a computer-type device, results in any of the various techniques and methods according to the subject matter disclosed herein. Exemplary computer-readable storage mediums that could be used for computer-readable storage medium 901 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A wireless terminal, comprising:
a receiver coupled to one or more antennas; and
a processor coupled to the receiver, the processor being configured to:
determine a channel power estimation $E_s$ for a carrier signal based on Channel State Information Reference Signals (CSI-RS) received by the receiver, the carrier signal being an additional carrier without the presence of a Cell-specific Reference Signal transmitted in a wireless network by a node providing wireless access to the wireless network, wherein the channel power estimation is determined by averaging a channel power from the one or more antennas, by using random precoding, or by using a subset of CSI-RS ports, or combinations thereof,
determine a noise plus interference I+N for the carrier signal based on a muted CSI-RS, and
calculate a Reference Signal Received Power (RSRP) measurement or a Reference Signal Received Quality (RSRQ) measurement, or a combination thereof, based at least in part on the channel power estimation and the noise plus interference.

2. The wireless terminal according to claim 1, further comprising a transmitter coupled to the processor, the transmitter being capable of transmitting to the node providing wireless access to the wireless network the determined channel power estimation $E_s$ and the determined noise plus interference I+N.

3. The wireless terminal according to claim 1, wherein a periodicity of the CSI-RS is 1, 2 or 3 subframes.

4. The wireless terminal according to claim 1, wherein the processor is further configured to determine signal power estimation $E_s$ as $$E_S = \frac{1}{N_t} \sum_{i=1}^{N_r} \sum_{j=1}^{N_t} |H_{i,j}|^2$$

in which N is the number of resource blocks (RBs) of the E-UTRA carrier RSSI measurement bandwidth, H is the channel response between $j^{th}$ transmit antenna and $i^{th}$ receive antenna, $N_r$ is the total number of receive antennas at UE, $N_t$ is the total number of transmit antennas at the node providing wireless access to the wireless network i is the receive antenna index, and j is the transmit antenna index.

5. The method according to claim 4, wherein the processor is further configured to determine the noise plus interference I+N for the carrier signal based on the muted CSI-RS as $$I + N = \frac{1}{N_r x N_t} \sum_{i=1}^{N_r} \sum_{j=1}^{N_t} |H_{i,j}|^2$$

in which $N_t$ is the number of muted CSI-RS ports, $N_r$ is the receive antenna number, $H_{i,j}$ is the estimated channel, and i and j are indices.

6. The wireless terminal according to claim 5, wherein a periodicity of the CSI-RS is 1, 2 or 3 subframes.

7. The wireless terminal according to claim 1, wherein the processor is further configured to determine the signal power estimation $E_S$ as $$E_S = \sum_{i=i}^{N_r} |H_i V|^2,$$

in which $H_i$ is the column vector corresponding to each receive antenna, V is the $N_t \times 1$ random precoder and i is the receive antenna index.

8. The wireless terminal according to claim 7, wherein the processor is further configured to determine the noise plus interference I+N for the carrier signal based on the muted CSI-RS as $$I+N = \frac{1}{N_r \times N_t} \sum_{i=1}^{N_r} \sum_{j=1}^{N_t} |H_{i,j}|^2$$

in which $N_t$ is the number of muted CSI-RS ports, $N_r$ is the receive antenna number, $H_{i,j}$ is the estimated channel, and i and j are indices.

9. The wireless terminal according to claim 7, wherein a periodicity of the CSI-RS is 1, 2 or 3 subframes.

10. The wireless terminal according to claim 1, wherein the processor is further configured to determine the noise plus interference I+N for the carrier signal based on the muted CSI-RS as $$I+N = \frac{1}{N_r \times N_t} \sum_{i=1}^{N_r} \sum_{j=1}^{N_t} |H_{i,j}|^2$$

in which $N_t$ is the number of muted CSI-RS ports, $N_r$ is the receive antenna number, $H_{i,j}$ is the estimated channel, and i and j are indices.

11. The wireless terminal according to claim 1, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

12. The wireless terminal according to claim 1, further comprising a touchscreen display capable of receiving input from a touch of a user or a stylus to control the processor.

13. A mobility measurement method in a wireless network, the method comprising:
 determining at a wireless terminal a channel power estimation $E_s$ for a carrier signal based on Channel State Information Reference Signals (CSI-RS), the carrier signal being an additional carrier without the presence of a Cell-specific Reference Signal, wherein the channel power estimation is determined by averaging a channel power from one or more antennas, by using random precoding, or by using a subset of CSI-RS ports, or combinations thereof;
 determining at the wireless terminal a noise plus interference I+N for the carrier signal based on a muted CSI-RS having a minimum periodicity less than 5 subframes; and
 calculating a Reference Signal Received Power (RSRP) measurement or a Reference Signal Received Quality (RSRQ) measurement, or a combination thereof, based at least in part on the channel power estimation and the noise plus interference.

14. The method according to claim 13, wherein the periodicity of the CSI-RS is 1, 2 or 3 subframes.

15. The method according to claim 13, wherein determining at the wireless terminal the signal power estimation comprises determining $E_S$ as $$E_S = \frac{1}{N} \sum_{i=1}^{N_r} \sum_{j=1}^{N_t} |H_{i,j}|^2$$

in which N is the number of resource blocks (RBs) of the E-UTRA carrier RSSI measurement bandwidth, H is the channel response between $j^{th}$ transmit antenna and $i^{th}$ receive antenna, $N_r$ is the total number of receive antennas at UE, $N_t$ is the total number of transmit antennas at a node providing wireless access to the wireless network, i is the receive antenna index, and j is the transmit antenna index.

16. The method according to claim 15, wherein determining at the wireless terminal the noise plus interference I+N for the carrier signal based on the muted CSI-RS comprises $$I+N = \frac{1}{N_r \times N_t} \sum_{i=1}^{N_r} \sum_{j=1}^{N_t} |H_{i,j}|^2$$

in which $N_t$ is the number of muted CSI-RS ports, $N_r$ is the receive antenna number, $H_{i,j}$ is the estimated channel, and i and j are indices.

17. The method according to claim 16, wherein the periodicity of the CSI-RS is 1, 2 or 3 subframes.

18. The method according to claim 13, wherein determining at the wireless terminal the signal power estimation comprises determining $E_S$ as $$E_S = \sum_{i=1}^{N_r} |H_i V|^2,$$

in which $H_i$ is the column vector corresponding to each receive antenna, V is the $N_t \times 1$ random precoder and i is the receive antenna index.

19. The method according to claim 18, wherein determining at the wireless terminal the noise plus interference I+N for the carrier signal based on the muted CSI-RS comprises $$I+N = \frac{1}{N_r \times N_t} \sum_{i=1}^{N_r} \sum_{j=1}^{N_t} |H_{i,j}|^2$$

in which $N_t$ is the number of muted CSI-RS ports, $N_r$ is the receive antenna number, $H_{i,j}$ is the estimated channel, and i and j are indices.

20. The method according to claim 18, wherein the periodicity of the CSI-RS is 1, 2 or 3 subframes.

21. The method according to claim 13, wherein determining at the wireless terminal the noise plus interference I+N for the carrier signal based on the muted CSI-RS comprises $$I+N = \frac{1}{N_r \times N_t} \sum_{i=1}^{N_r} \sum_{j=1}^{N_t} |H_{i,j}|^2$$

in which $N_t$ is the number of muted CSI-RS ports, $N_r$ is the receive antenna number, $H_{i,j}$ is the estimated channel, and i and j are indices.

22. The method according to claim 13, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

23. The method according to claim 13, wherein the wireless terminal comprises a touchscreen display capable of receiving input from a touch of a user or a stylus.

24. A wireless terminal, comprising:
a receiver capable of determining a channel power estimation $E_s$ for a carrier signal based on Channel State Information Reference Signals (CSI-RS), wherein the channel power estimation is determined by averaging a channel power from one or more antennas, by using random precoding, or by using a subset of CSI-RS ports, or combinations thereof, the carrier signal being an additional carrier without the presence of a Cell-specific Reference Signal transmitted in a wireless network by a node providing wireless access to the wireless network, capable of determining at the mobile station a noise plus interference I+N for the carrier signal based on a muted CSI-RS having a periodicity of the CSI-RS is 1, 2 or 3 subframes, and capable of calculating a Reference Signal Received Power (RSRP) measurement or a Reference Signal Received Quality (RSRQ) measurement, or a combination thereof, based at least in part on the channel power estimation and the noise plus interference; and
a transmitter capable of transmitting to the node providing wireless access to the wireless network the determined channel power estimation $E_s$ and the determined noise plus interference I+N .

25. The wireless terminal according to claim 24, wherein the signal power estimation $E_S$ is determined as $$E_S = \frac{1}{N}\sum_{i=1}^{N_r}\sum_{j=1}^{N_t}|H_{i,j}|^2$$

in which N is the number of resource blocks (RBs) of the E-UTRA carrier RSSI measurement bandwidth, H is the channel response between $j^{th}$ transmit antenna and $i^{th}$ receive antenna, $N_r$ is the total number of receive antennas at UE, $N_t$ is the total number of transmit antennas at the node providing wireless access to the wireless network, i is the receive antenna index, and j is the transmit antenna index, or $$E_S = \sum_{i=i}^{N_r}|H_i V|^2;$$

in which $H_i$ is the column vector corresponding to each receive antenna, V is the $N_t \times 1$ random precoder and i is the receive antenna index,
wherein the noise plus interference I+N for the carrier signal based on the muted CSI-RS is determined as $$I+N = \frac{1}{N_r x N_t}\sum_{i=1}^{N_r}\sum_{j=1}^{N_t}|H_{i,j}|^2$$

in which $N_t$ is the number of muted CSI-RS ports, $N_r$ is the receive antenna number, $H_{i,j}$ is the estimated channel, and i and j are indices; and
wherein a periodicity of the CSI-RS is 1, 2 or 3 subframes.

26. The wireless terminal according to claim 24, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

27. The wireless terminal according to claim 24, further comprising a touchscreen display capable of receiving input from a touch of a user or a stylus to control the processor.

28. An article comprising: a non-transitory computer-readable medium having stored thereon instructions that, if executed, result in at least the following:
determining at a wireless terminal a channel power estimation $E_s$ for a carrier signal based on Channel State Information Reference Signals (CSI-RS), the carrier signal being an additional carrier in a wireless network without the presence of a Cell-specific Reference Signal,
the signal power estimation $E_s$ being determined as $$E_S = \frac{1}{N}\sum_{i=1}^{N_r}\sum_{j=1}^{N_t}|H_{i,j}|^2$$

in which N is the number of resource blocks (RBs) of the E-UTRA carrier RSSI measurement bandwidth, H is the channel response between $j^{th}$ transmit antenna and $i^{th}$ receive antenna, $N_r$ is the total number of receive antennas at UE, $N_t$ is the total number of transmit antennas at a node providing wireless access to the wireless network, i is the receive antenna index, and j is the transmit antenna index, or $$E_S = \sum_{i=i}^{N_r}|H_i V|^2;$$

in which $H_i$ is the column vector corresponding to each receive antenna, V is the $N_t \times 1$ random precoder and i is the receive antenna index; and
determining at the wireless terminal a noise plus interference I+N for the carrier signal based on a muted CSI-RS, wherein the noise plus interference I+N for the carrier signal based on the muted CSI-RS is determined as $$I+N = \frac{1}{N_r x N_t}\sum_{i=1}^{N_r}\sum_{j=1}^{N_t}|H_{i,j}|^2$$

in which $N_t$ is the number of muted CSI-RS ports, $N_r$ is the receive antenna number, $H_{i,j}$ is the estimated channel, and i and j are indices; and wherein a periodicity of the CSI-RS comprises 1, 2 or 3 subframes.

29. The article according to claim 28, wherein the wireless network comprises one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

30. The article according to claim 28, wherein the wireless terminal comprises a touchscreen display capable of receiving input from a touch of a user or a stylus.

* * * * *